United States Patent [19]

Powers

[11] Patent Number: 5,074,508
[45] Date of Patent: Dec. 24, 1991

[54] CAP SUPPORTING CLIP

[76] Inventor: Harold C. Powers, 1724-D Peaceable Rd., McAlester, Okla. 74501

[21] Appl. No.: 617,712

[22] Filed: Nov. 26, 1990

[51] Int. Cl.5 .............................................. E04G 3/00
[52] U.S. Cl. ...................................... 248/291; 211/31; 224/42.45 R; 224/312; 248/205.3; 248/231.8
[58] Field of Search .................. 248/205.3, 229, 231.8, 248/291, 316.7, 309.1, 902, 905; 211/30, 31, 32, 33; 224/312, 42–45

[56] References Cited

U.S. PATENT DOCUMENTS

| 1,469,532 | 10/1923 | Priem | 211/30 |
| 1,530,180 | 3/1925 | Holmes | 248/316.7 X |
| 1,769,803 | 7/1930 | Myers | 248/316.7 X |
| 2,564,517 | 8/1951 | Beals | 248/229 X |
| 2,718,414 | 9/1955 | Knox et al. | 211/31 X |
| 2,825,988 | 3/1958 | O'Reilly | 224/312 X |
| 3,521,225 | 7/1970 | Kursman et al. | 248/291 X |
| 4,312,455 | 1/1982 | Weber | 248/205.3 X |
| 4,759,252 | 7/1988 | Occhipinti | 248/229 X |
| 4,821,891 | 4/1989 | Williams | 211/31 |
| 4,961,555 | 10/1990 | Egan, Jr. | 248/231.8 |

FOREIGN PATENT DOCUMENTS

| 0331500 | 11/1935 | Italy | 211/31 |
| 1075403 | 7/1967 | United Kingdom | 248/291 |

Primary Examiner—Ramon O. Ramirez
Attorney, Agent, or Firm—Robert K. Rhea

[57] ABSTRACT

A device for supporting a vehicle driver's cap in a secure out of the way position within a vehicle cab is formed by a friction clip releasably gripping the bill of the cap. The friction clip is pivotally mounted to a member mounting the clip to a vehicle visor or the interior surface of the vehicle cab overhead position.

2 Claims, 1 Drawing Sheet

CAP SUPPORTING CLIP

BACKGROUND OF THE INVENTION

1. Field of the Invention

This invention relates to cap and hat racks and more particularly to a clip for supporting a vehicle driver's cap on the interior of a truck cab or the like.

Truck drivers wearing caps frequently like to remove their cap when driving however truck or other vehicle interiors are not ordinarily provided with a rack or place to hang or support a cap in an out of the way place yet readily available for use by the driver when he should desire to leave the vehicle.

This invention provides a clip for mounting a cap to a vehicle visor.

2. Description of the Prior Art

Prior patents disclose a number of different clips for gripping articles and inturn gripping the visor of a vehicle to hold an article in a readily available position. None of the prior patents so far as I know disclose a clip or other mounting member which attaches to a vehicle visor or the interior of a truck cab and pivotally supports a friction clamp releasably gripping the bill of a driver's cap for maintaining it adjacent the head liner or interior of the vehicle top.

This invention provides such a cap holding clip.

SUMMARY OF THE INVENTION

A cap bill receiving friction clip is formed from an elongated rectangular section of material having its central portion struck out from one end thereof to form a pair of parallel legs lying in a common plane.

The struck out portion forms a third leg disposed in upward parallel relation with respect to the plane of the parallel legs forming a space which frictionally receives in gripping relation the bill of a conventional cap.

The friction clip is pivotally mounted to a mounting member for attachment to an interior surface or member of a vehicle.

In one embodiment, the mounting member comprises a planar material substantially U-shaped clamp which frictionally grips one edge of a vehicle visor at its normally forwardly disposed edge portion thus disposing the three leg cap bill grip in a rearward direction with the pivotal joint between the two permitting the friction clip to be raised or lowered for disposing the supported cap adjacent the interior overhead surface of a vehicle cab or the like.

In another embodiment, the friction clip is pivotally connected with a rectangular planar member having adhesive material on one surface for connecting or bonding the planar member to an interior surface of an overhead portion of a vehicle interior.

The principal object of this invention is to provide a cap bill friction engaging clip pivotally mounted to a mounting member for attachment to an interior surface of a vehicle adjacent the driver's position.

DESCRIPTION OF THE PREFERRED EMBODIMENTS

Figure 1:
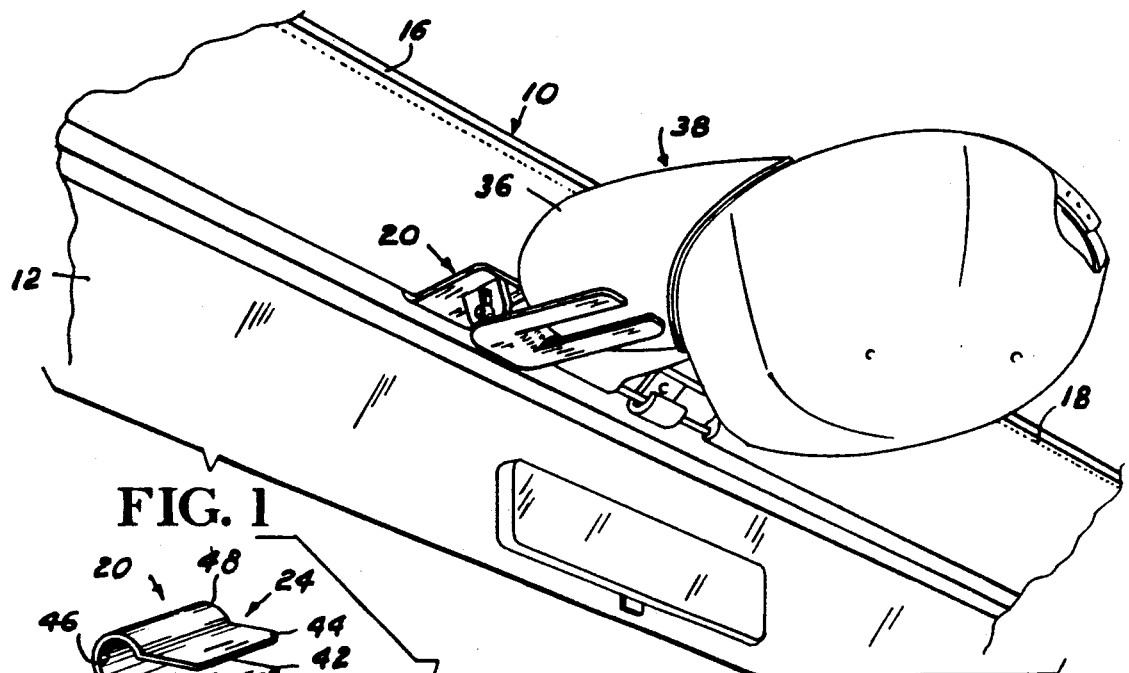
FIG. 1 a fragmentary perspective view of a vehicle cab overhead port and visor illustrating one embodiment of the invention supporting a cap.

Like characters of reference designate like parts in those figures of the drawings in which they occur.

In the drawings:

Reference numeral 10 indicates the forward upper interior of the vehicle, such as a truck cab or the like, having a windshield 12 supported by the upper forward portion 14 of the cab top and having a pair of visors 16 and 18 disposed forwardly and upwardly of the driver and passenger position, respectively.

The reference numeral 20 indicates a preferred embodiment of the invention comprising a friction clip 22 pivotally connected in the manner presently explained with a mounting member 24 for securing the device to one of the visors, for example the visor 16.

The clip 22 is formed from a rectangular section of planar material such as molded plastic material having forward and rearward ends 26 and 28 respectively, and a selected width.

The clip 22 is longitudinally slotted from its rearward end in parallel spaced apart relation to form a pair of fingers or legs 30 and 32 disposed in parallel spaced relation in a common plane.

The central portion of the member 22 between the two slots forms a third leg 34 which is off-set upwardly, as viewed in the drawings, from the plane of the legs 30 and 32 to lie in upward spaced relation with respect to the plane of legs 30 and 32 with the rearward end portion of the leg 34 preferably converging toward the plane of the legs 30 and 32. The leg 34 thus defines a substantially horizontal slot 35 between the planes of the legs open rearwardly for frictionally receiving, between the fingers 30 and 32 and the finger 34, the bill 36 of a conventional cap 38.

Adjacent its forward end 26, the member 22 is centrally provided with an upstanding ear 40 forming one-half of the hinge means 25.

The visor clamp 24 is formed from a length of sheet metal material arcuately bent intermediate its ends to form a pair of clamp legs 42 and 44 and define an arcuate bight portion 46 which is bulged adjacent its juncture with the leg 44, as at 48, for cooperatively receiving the normally forward edge of the visor 16 when engaged therewith, as illustrated by FIG. 1.

Figure 2:
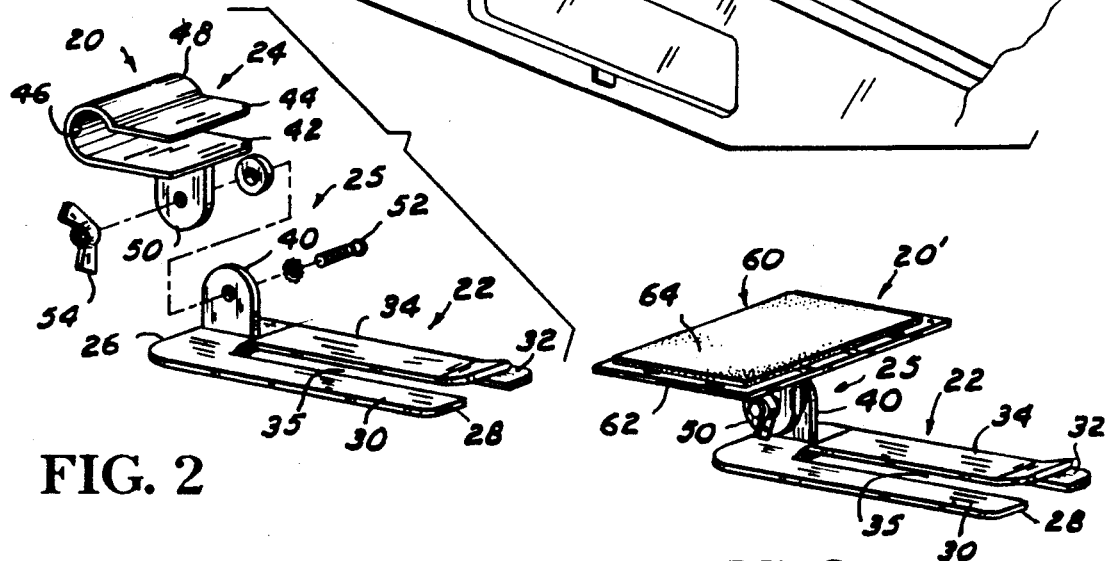
FIG. 2 is an exploded perspective view of the cap support, illustrated by FIG. 1.

The clamp leg 42 is provided, opposite the clamp leg 44, with a cooperating hinge ear 50 depending therefrom as viewed in FIG. 2. Both ears 40 and 50 being centrally apertured in cooperative relation for receiving a screw 52 and a wing nut 54 for adjusting the tension of the hinge means 25 and the position of the clip 22 relative to the clamp 24.

Figure 3:
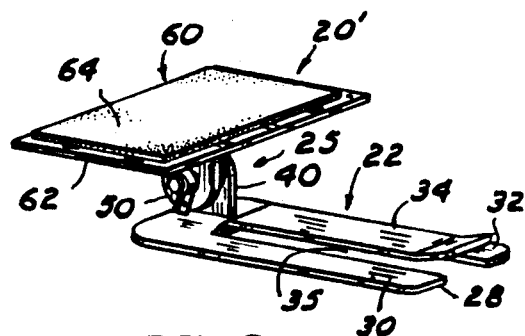
FIG. 3 a perspective view of a second embodiment.
Figure 4:
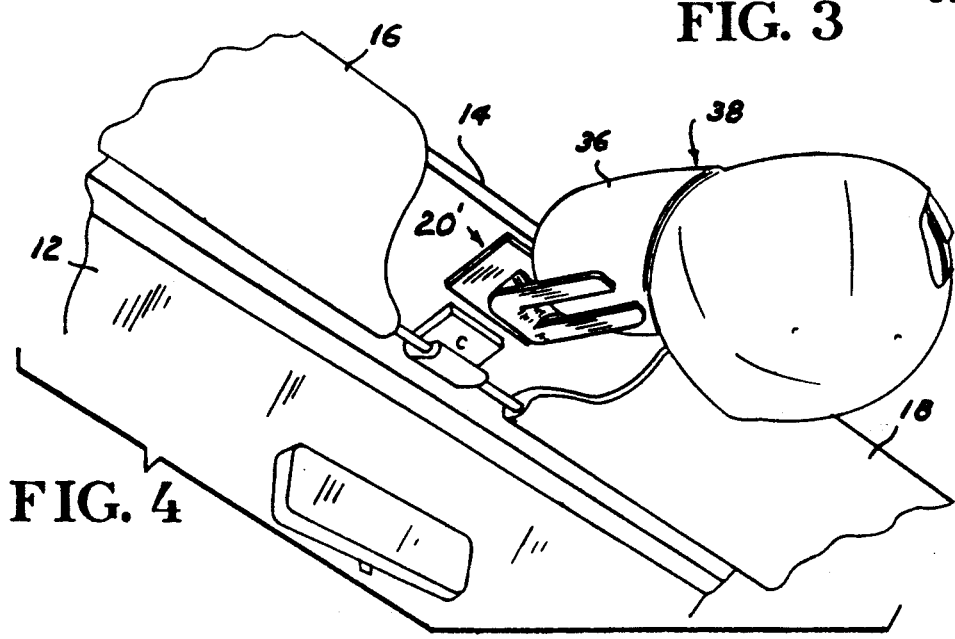
FIG. 4 a view similar to FIG. 1 illustrating the device of FIG. 3 in cap supporting relation when attached to the interior of a vehicle.

The other embodiment 20', illustrated by FIGS. 3 and 4 comprises a friction clip portion 22, identical with the clip portion 22 in FIGS. 1 and 2, and similarly is provided with hinge means 25 connecting the clip to a vehicle mounting means 60.

The mounting means 60 comprises a rectangular section of sheet material 62 having the hinge ear 50 connected and depending from one planar surface thereof and having its opposite or upward surface, as viewed in FIG. 3, provided with a section of bonding material 64 having an adhesive surface bonding it to the rectangular member 62 and an opposite adhesive surface, normally covered by a protective sheet, not shown, which is removed for mounting the member 60 to the interior overhead surface of the vehicle cab 14, as illustrated by FIG. 4.

OPERATION

In operation, assuming the preferred embodiment 20 is constructed and assembled as described hereinabove, the clamp member 24 is frictionally engaged with the forward edge portion of a visor, such as the visor 16, and the bill 36 of a cap 38 is frictionally inserted between the legs 34, 30 and 32.

The thumb screw 54 if not sufficiently tight, is tightened to maintain the cap in an inverted position adjacent the inner top surface of the vehicle cab, as illustrated by FIG. 1.

Operation of the other embodiment 20', is similar to that described hereinabove for the preferred embodiment with the exception that when the embodiment 20' is assembled as illustrated by FIG. 3, the adhesive protective sheet, not shown, over the cab bonding surface is removed and the adhesive surface is applied to the interior surface of the vehicle cab at an overhead position, preferably between the two visors 16 and 18.

Thereafter, the operation of the device 20' is substantially identical with that of the preferred embodiment with the exception that when it is desired to use the visor 16 as a sunshade for the driver's eyes, either in the forward or lateral side position, the driver's cap offers no obstruction to his vision or the necessity of removing it from its clip supported position.

Obviously the invention is susceptible to changes or alterations without defeating its practicability. Therefore, I do not wish to be confined to the preferred embodiment shown in the drawings and described herein.

I claim:

1. In a vehicle having a cab enclosing the driver's position and characterized by an inner overhead surface having a driver's sun visor secured thereto, the improvement comprising:
   cap bill holding means for supporting a driver's cap adjacent the overhead surface of the vehicle cab including:
   a planar spring clip having forward and rearward ends and having first and second legs projecting rearwardly in parallel laterally spaced relation and having a third rearwardly projecting leg laterally offset with respect to the plane of the first and second legs and converging rearwardly toward the plane of the first and second legs;
   spring clip anchor means comprising a U-shaped clamp frictionally gripping an edge portion of the visor for connecting the spring clip to an interior surface of the vehicle cab;
   hinge means comprising a planar ear secured respectively to said spring clip and said clamp and connecting said spring clip with the anchor means for vertical pivoting of the spring clip relative to the anchor means about a horizontal axis; and,
   screw means flatly connecting each said ear to the other said ear.

2. In a vehicle having a cab enclosing the driver's position and characterized by an inner overhead surface having a driver's sun visor secured thereto, the improvement comprising:
   cap bill holding means for supporting a driver's cap adjacent the overhead surface of the vehicle cab including:
   a planar spring clip having forward and rearward ends and having first and second legs projecting rearwardly in parallel laterally spaced relation and having a third rearwardly projecting leg laterally offset with respect to the plane of the first and second legs and converging rearwardly toward the plane of the first and second legs;
   spring clip anchor means comprising a U-shaped clamp frictionally gripping an edge portion of the visor for connecting the spring clip to an interior surface of the vehicle cab;
   said anchor means further comprising a planar member and bonding material interposed between the planar member and the vehicle interior surface;
   hinge means comprising a planar ear secured respectively to said spring clip and said clamp and connecting said spring clip with the anchor means for vertical pivoting of the spring clip relative to the anchor means about a horizontal axis; and,
   screw means flatly connecting each said ear to the other said ear.

* * * * *